United States Patent
Novick et al.

(10) Patent No.: US 7,620,669 B1
(45) Date of Patent: Nov. 17, 2009

(54) SYSTEM AND METHOD FOR ENHANCING LOG PERFORMANCE

(75) Inventors: Yoram Novick, Cupertino, CA (US); Erez Webman, Tikva (IL)

(73) Assignee: NetApp, Inc., Sunnyvale, CA (US)

( * ) Notice: Subject to any disclaimer, the term of this patent is extended or adjusted under 35 U.S.C. 154(b) by 226 days.

(21) Appl. No.: 11/640,008

(22) Filed: Dec. 15, 2006

(51) Int. Cl.
*G06F 17/30* (2006.01)
*G06F 17/00* (2006.01)

(52) U.S. Cl. .................. 707/204; 707/200; 707/202
(58) Field of Classification Search ........ None
See application file for complete search history.

(56) References Cited

U.S. PATENT DOCUMENTS

| | | | |
|---|---|---|---|
| 5,819,292 | A | 10/1998 | Hitz et al. |
| 5,948,110 | A | 9/1999 | Hitz et al. |
| 5,950,225 | A | 9/1999 | Kleiman |
| 5,963,962 | A | 10/1999 | Hitz et al. |
| 6,038,570 | A | 3/2000 | Hitz et al. |
| 6,138,126 | A | 10/2000 | Hitz et al. |
| 6,199,244 | B1 | 3/2001 | Hilgers et al. |
| 7,096,382 | B2 | 8/2006 | Novick |
| 7,249,150 | B1 | 7/2007 | Watanabe et al. |
| 7,293,203 | B1 | 11/2007 | Coatney et al. |
| 7,376,866 | B1 | 5/2008 | Sarma |
| 7,395,378 | B1 * | 7/2008 | Pendharkar et al. ......... 711/144 |
| 7,426,617 | B2 | 9/2008 | Stager |
| 7,430,571 | B2 | 9/2008 | Edwards |

OTHER PUBLICATIONS

U.S. Appl. No. 10/858,169 entitled Technique for Accelerating Log Replay With Partial Cache Flush; filed Jun. 1, 2004 by Bruce W. Leverett.
U.S. Appl. No. 60/272,782 entitled A System and Method for Asynchronous Replication for Storage Area Networks; filed Mar. 5, 2001 by Yoram Novick.

\* cited by examiner

*Primary Examiner*—Baoquoc N To
(74) *Attorney, Agent, or Firm*—Cesari and McKenna, LLP

(57) ABSTRACT

A system and method enhances performance of a log adapted for use with a storage system. The log is illustratively organized into a plurality of regions, wherein each region comprises one or more entries and wherein each region is allocated to a consistency collection. As used herein, a consistency collection is defined as a set of one or more data containers among which it is desired to maintain transaction consistency, i.e., atomicity of updates of a transaction to those containers. Each entry of the region is adapted to store an update of data from a source, e.g., an application executing on the storage system. Thus, the consistency collection may comprise multiple data containers associated with one or more applications configured to maintain the atomicity of transaction updates to the collection of containers.

20 Claims, 4 Drawing Sheets

SYSTEM AND METHOD FOR ENHANCING LOG PERFORMANCE

FIELD OF THE INVENTION

The present invention relates to storage systems and, more specifically, to enhancing performance of a log adapted for use with a storage system.

BACKGROUND OF THE INVENTION

A storage system is a computer that provides storage services relating to the organization of information on writeable persistent storage devices, such non-volatile memories, tapes or disks. The storage system typically includes a storage operating system that implements a file system to logically organize the information as a hierarchical structure of data containers, such as volumes and files on, e.g., the disks. Each "on-disk" file may be implemented as set of data structures, e.g., disk blocks, configured to store information, such as the actual data for the file. A volume, on the other hand, may comprise a collection of disks cooperating to define a logical arrangement of volume block number space for organizing the disk blocks.

The storage system may be further configured to operate according to a client/server model of information delivery to thereby allow many clients to access files stored on the system, e.g., a filer server or filer. In this model, the client may comprise an application, such as a database application, executing on a computer that "connects" to the storage system over a computer network, such as a point-to-point link, shared local area network, wide area network or virtual private network implemented over a public network, such as the Internet. Alternatively, the client may comprise one or more applications, such as database applications, executing directly on the storage system. Each client may request the services of the file system by issuing file system protocol messages to the storage operating system.

A common type of file system is a "write in-place" file system, an example of which is the conventional Berkeley fast file system. In a write in-place file system, the locations of the data structures on disk are typically fixed. That is, the disk is "viewed" as a large sequential array of blocks and changes (updates) to the data of a file stored in the blocks are made in-place, i.e., data is overwritten at the same disk locations. The write in-place file system may assume a layout such that the data is substantially contiguously arranged on disks. This disk layout results in efficient access operations, particularly for sequential read operations, directed to the disks. Updating of data in-place thus maintains efficient read access to the data, but often at the expense of write performance.

Note that any storage interconnected via, e.g., a storage area network by protocols such as Fibre Channel or direct attached storage interconnected by protocols such as IDE can be viewed as a "write in-place" file system with a very simple mapping of client logical data blocks to blocks in storage.

Another type of file system is a log-structured file system that does not overwrite data on disks. If a data block on disk is retrieved (read) from disk into memory of the storage system and "dirtied" or changed (updated) with new data provided by, e.g., an application, the data block is stored (written) to a new sequential location on disk to optimize write performance. Updates to the data of a file (hereinafter "updates") may thus result in random, relocation of the blocks on disks. Over time and after many updates, the blocks of the file may become randomly scattered over the disks such that the file can become fragmented. This, in turn, causes sequential access operations, such as sequential read operations, of the file to randomly access the disks. Random access operations to a fragmented file are generally much slower than sequential access operations, thereby adversely impacting the overall performance of those operations. Note that the invention described herein is not limited to file systems or even to updates of files, but may apply to other types of storage systems and updates such as, updates to blocks.

An improvement to the log structured file system involves grouping of the updates into "batches". Batching of updates improves the efficiency of access operations by sequentially writing long streams of updates, while also minimizing fragmentation. Batch updates may be implemented in a manner similar to page memory wherein, instead of allocating regions of memory address space, regions of disk storage space are allocated by the file system. Each region or "page" may comprise a predetermined amount of storage space. Thus, every time data is written to disk, the file system writes a "batch" of data, preferably sequentially, to an allocated page of disk space, and searches for another unallocated ("free") page to which to write the next batch of data.

Often, the application (e.g., a database application) executing on the storage system has a requirement to store data temporarily, but in a persistent manner. In database terminology, a transaction is an arrangement to store changes to data or updates in a database (e.g., on a persistent storage subsystem) atomically, i.e., either all related updates issued by the application are stored or none are stored. When performing operations on behalf of the database application, the storage system typically executes a sequence of predefined tasks that transitions the system and its storage subsystem from one consistent state to another. This sequence is called a "consistent transaction".

Because of the need to maintain transaction consistency, updates in such a storage system are not stored on the storage subsystem immediately, but are rather stored in a temporary, yet persistent, storage space (such as non-volatile memory or disk) of the system organized as a "log". As used herein, the log is a record of updates used for backup and recovery of data served by a storage system, particularly in the presence of a failure in the system. Once the updates are stored in the log, where they can be recovered in light of the failure, they are moved to the persistent storage subsystem in a consistent manner. The temporary storage space of the log is persistent because the system complies with the consistency requirement that dictates that, for a transaction comprising a set of updates, either all or none of the updates are committed to the persistent storage subsystem.

For example, assume a transaction consists of a plurality of updates, each of which is processed independently by the storage system. Moreover, assume that a failure occurs after some of these updates (but not all) are committed to the persistent storage subsystem. As a result, the storage subsystem is left in an inconsistent state. Accordingly, the application initially records all updates to the log and, only when all updates are stored therein, transfers them to the storage subsystem. If a failure occurs during transfer to the persistent storage subsystem, the data can be recovered from the temporary persistent storage of the log to enable "rolling" backward or forward. That is, once all portions (i.e., individual updates of data) of the entire transaction are stored in the log, the application attempts to write the updated data to the persistent storage subsystem and, if a failure occurs, the data can be recovered from the log.

Note that the data in the log is self contained since it must be usable following any failure. Therefore, properties of the log are provided to retrieve the ordering of the updates to the log for a given transaction and to determine whether some updates that were supposed to be applied to the log are missing. These properties ensure the integrity of the data in the log.

A problem associated with the log adapted for use with a storage system involves emptying (i.e., releasing of the contents) of the log. The log typically comprises a plurality of entries, each of which stores an update. The updates are initially stored (recorded) on the log starting at a first entry and proceeding to a last entry, at which point the log "wraps around" to the first entry. As long as the entries have been released before they are needed again, new updates may be recorded to those released entries. The updates are typically recorded in entries of the log in the order in which they are received from one or sources, e.g., one or more applications. However, the updates may not be released, from the log in exactly that same order. This is typically the case if multiple updates to multiple different transactions were made at the same time. While they are stored to the log sequentially, the updates may be released at different times since the different transactions may be completed at different times. As a result, the log may become fragmented. Therefore, even if a large number of entries have been released such that the log is only partially full when wrapping around to the first entry, fragmentation of the log may inhibit the efficient recording of updates. The present invention is directed, in part, to solving this fragmentation problem.

An even more significant issue with fragmentation is the fact that once the log becomes full it "wraps around" to the first entry and continues adding entries from there. Once the log is fragmented, it is expected that sooner or later the log will reach an entry that cannot be written (because it has valid data). Therefore, while there may be a substantial amount of "free" entries, the log may not be able to utilize them. It should be noted that batching does not alleviate the fragmentation problem since updates are added to the batch based on temporal locality (when they were performed) but are released based on when a transaction is committed or aborted (which may differ from temporal locality).

SUMMARY OF THE INVENTION

The present invention overcomes the disadvantages of the prior art by providing a system and method for enhancing performance of a log adapted for use with a storage system. The log is illustratively organized into a plurality of regions, wherein each region comprises one or more entries and wherein each region is allocated to a consistency collection. As used herein, a consistency collection is defined as a set of one or more data containers among which it is desired to maintain transaction consistency. Each entry of the region is adapted to store an update of data from a source, e.g., an application executing on the storage system. Thus, the consistency collection may comprise multiple data containers associated with one or more applications configured such that all updates for a given transaction are stored in the consistency collection. Thus, all updates for a given transaction are stored in the same region.

In the illustrative embodiment, the application issues updates of a transaction to the log, where they are recorded in entries of a region allocated to a consistency collection. As long as the consistency collection is in active mode, the updates in the entries of the region may be released from the log for persistent storage in a desired order on a storage subsystem of the storage system. Once all of the updates of a region are released (committed) to the persistent storage subsystem or aborted altogether, the region is available for reallocation. However, if the consistency collection transitions to an inactive or "frozen" mode, the updates in the entries of the region are not released from the log and region is not available for reallocation. Accordingly, the organization of the log into entries adapted to accommodate active consistency collection regions, despite the occurrence of inactive regions, reduces fragmentation of the log while maintaining transaction consistency by, e.g., ensuring that either all updates for a transaction are released from the log or none of those updates are released.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF ILLUSTRATIVE EMBODIMENTS

Figure 1:
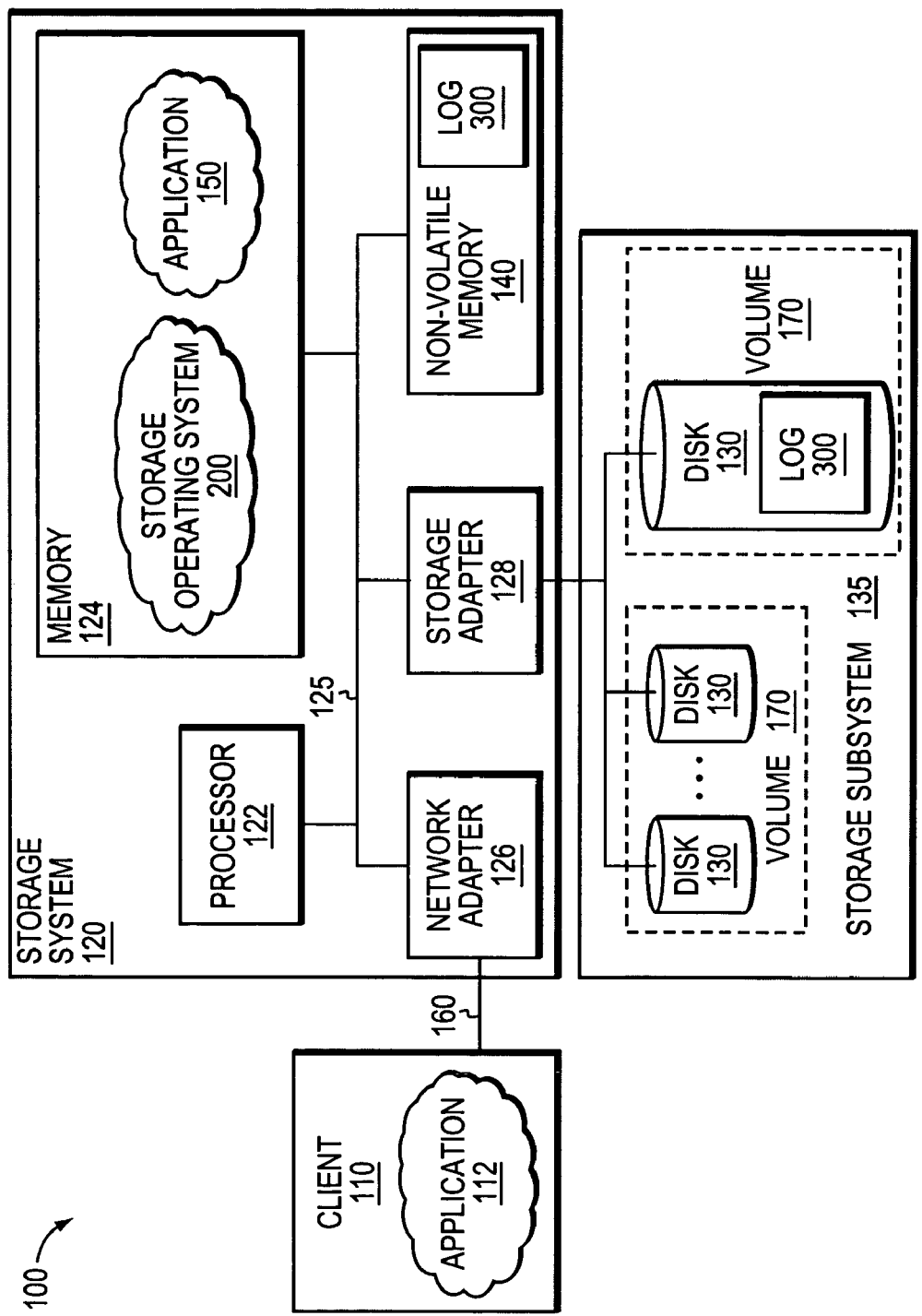
FIG. 1 is a schematic block diagram of an environment including a storage system that may be advantageously used with the present invention.

FIG. 1 is a schematic block diagram of an environment 100 including a storage system that may be advantageously used with the present invention. The storage system 120 is a computer that provides storage services relating to the organization of information on writable persistent storage devices, such as disks 130 of a storage subsystem 135. To that end, the storage system 120 comprises a processor 122, a memory 124, a network adapter 126, a storage adapter 128 and nonvolatile memory 140 interconnected by a system bus 125. The storage system 120 also includes a storage operating system 200 that implements a file system to logically organize the information as a hierarchical structure of data containers, such as volumes and files, on the disks 130.

The memory 124 comprises storage locations that are addressable by the processor and adapters for storing software programs and data structures associated with the embodiments described herein. The processor and adapters may, in turn, comprise processing elements and/or logic circuitry configured to execute the software programs and manipulate the data structures. The storage operating system 200, portions of which is typically resident in memory and executed by the processing elements, functionally organizes the storage system by, inter alia, invoking storage operations in support of software processes executing on the system. These software processes may include one or more applications 150, such as a database application. It will be apparent to those skilled in the art that other processing and memory means, including various computer readable media, may be used to store and execute program instructions pertaining to the inventive technique described herein.

The network adapter 126 comprises the mechanical, electrical and signaling circuitry needed to connect the storage system 120 to a client 110 over a computer network 160, which may comprise a point-to-point connection or a shared medium, such as a local area network. The client 110 may be a general-purpose computer configured to execute applications 112, such as a database application. Moreover, the client 110 may interact with the storage system 120 in accordance with a client/server model of information delivery. That is, the client may request the services of the storage system, and the system may return the results of the services requested by the client, by exchanging file system protocol messages or packets encapsulating, e.g., the Common Internet File System (CIFS) protocol or Network File System (NFS) protocol format over the network 160.

The storage adapter 128 cooperates with the storage operating system 200 executing on the storage system to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128) prior to being forwarded over the system bus 125 to the application 150 or to the network adapter 126, where the information is formatted into a packet and returned to the client 110.

Storage of information on the subsystem 135 is preferably implemented as one or more storage "volumes" 170 that comprise one or more disks 130 cooperating to define an overall logical arrangement of volume block number (vbn) space on the volume(s). Each volume 170 is generally, although not necessarily, associated with its own file system. The disks within a volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 130, the storage operating system 200 implements a file system that logically organizes the information as a hierarchical structure of data containers, such volumes or files, on the disks. Each "on-disk" file may be implemented as set of disk blocks configured to store information, such as data, whereas the volume, as noted, may comprise one or more disks cooperating to define a logical arrangement of vbn space for organizing the disk blocks. In an illustrative embodiment described herein, the operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate file system can be used, and as such, where the term "WAFL" is employed, it should be taken broadly to refer to any file system that is otherwise adaptable to the teachings of this invention.

Often, an application 112, 150, such as a database application, has a requirement to store data temporarily, but in a persistent manner. In database terminology, a transaction is an arrangement to store changes to data or updates in a database (e.g., on the storage subsystem 135) atomically, i.e., either all related updates issued by the application are stored or none are stored. When performing operations on behalf of the database application, the storage system 120 typically executes a sequence of predefined tasks that transitions the system and its storage subsystem 135 from one consistent state to another. This sequence is called a "consistent transaction" and, in accordance with a consistency requirement, a commit operation ensures that all updates directed to the transaction are performed or that none are performed.

Because of the need to maintain transaction consistency, updates in the storage system 120 are not stored on the storage subsystem 135 immediately, but are rather stored in a temporary, yet persistent, storage space (such as non-volatile memory 140 or disk 130) of the system organized as a log 300. As described further herein, the log 300 is adapted to record the updates received from the application 112, 150 in any order and release the updates to the storage subsystem 135 for persistent storage in an order desired by the application once the application performs a "commit". To that end, the storage system 120 may be illustratively embodied as a database system that uses the log 300 to maintain transaction consistency. Alternatively, the log 300 may be used in a disaster recovery environment to record updates intercepted at a primary storage site and forwarded to a secondary replication site, and to release those updates to the storage subsystem for persistent storage consistently in any order or in a desired order.

Figure 2:
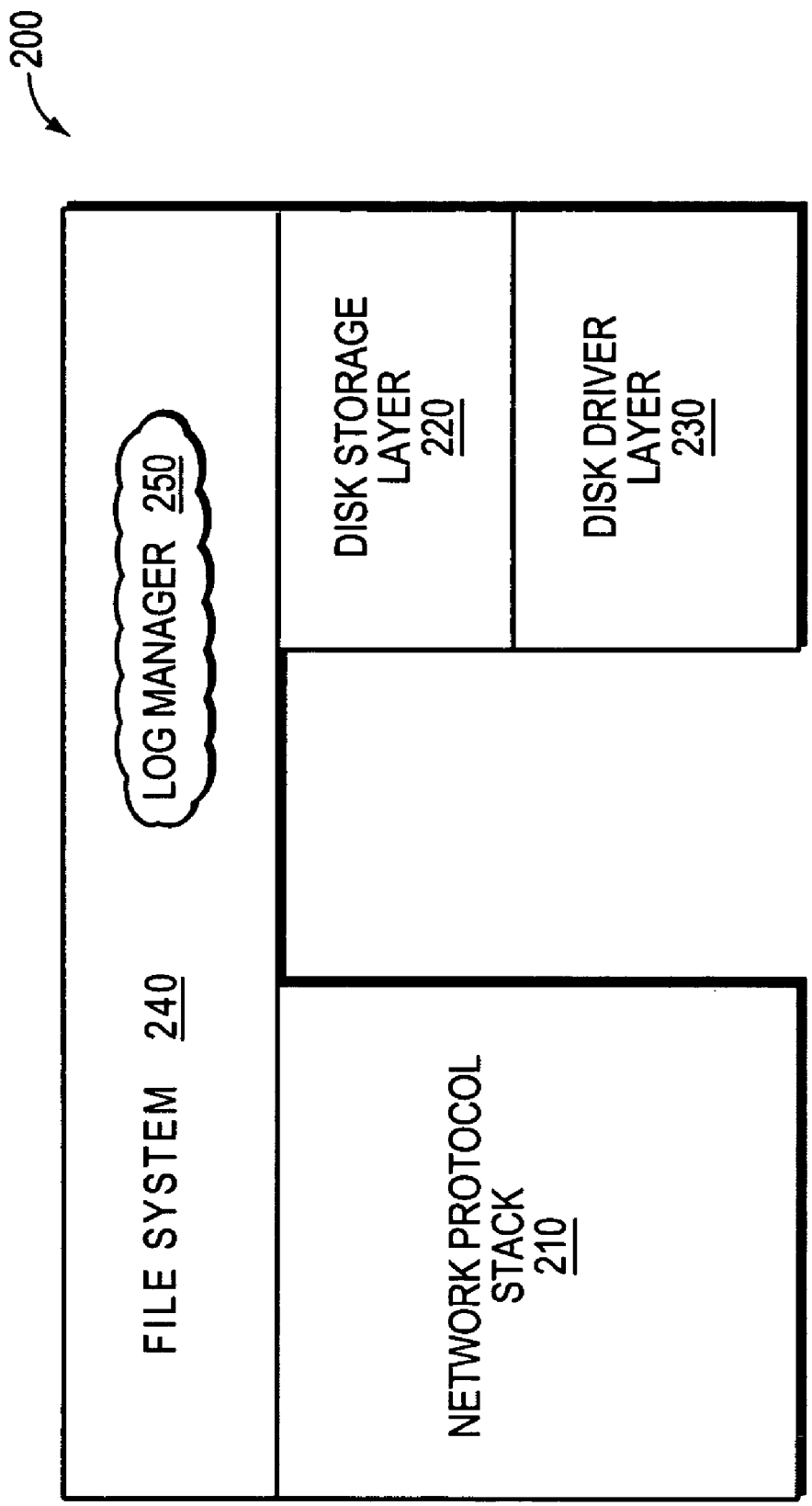
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers, including a network driver layer (e.g., an Ethernet driver), a network protocol layer (e.g., an Internet Protocol layer and its supporting trans-port mechanisms, the Transport Control Protocol layer and the User Datagram Protocol layer), as well as a file system protocol server layer (e.g., a CIFS server, a NFS server, etc.) organized as a network protocol stack 210. In addition, the storage operating system 200 includes a disk storage layer 220 that implements a disk storage protocol, such as a RAID protocol, and a disk driver layer 230 that implements a disk access protocol such as, e.g., a Small Computer Systems Interface (SCSI) protocol.

Bridging the disk software layers with the network and file system protocol layers is a file system layer that implements a file system 240. The file system 240 is illustratively a message-based system that provides logical volume management capabilities for use in access to the information stored on the storage devices, such as non-volatile memory 140 and disks 130. That is, in addition to providing file system semantics, the file system 240 provides functions normally associated with a volume manager. These functions include (i) aggregation of the disks, (ii) aggregation of storage bandwidth of the disks, and (iii) reliability guarantees, such as mirroring and/or parity (RAID).

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description illustratively describes a write any where file system, the teachings of the present invention may be utilized with any suitable file system, including a write in-place file system.

The present invention is directed to a system and method for enhancing performance of a log, such as log 300, that is adapted for use with a storage system, such as storage system 120. As noted, the log 300 is illustratively implemented on a temporary, but persistent, storage area or device, such as disk 130 or non-volatile memory 140. A log manager 250 manages the log 300, including the organization of the temporary, persistent storage space of the log in accordance with the present invention. In an illustrative embodiment, the log manager 250 is embodied as a process of the file system 240, although it will be apparent to those skilled in the art that the log manager 250 can be implemented as a process of the disk driver layer 230, an application program, or any other specialized log management software of the storage operating system 200. In addition, the log 300 is illustratively embodied in the same storage system 120 on which the consistency collections are embodied, although it will be apparent to those skilled in the art that the log 300 can be embodied in a different storage system. Moreover, in other embodiments of the present invention, the log manager can be implemented in the client 110 rather than in the storage system 120.

Figure 3:
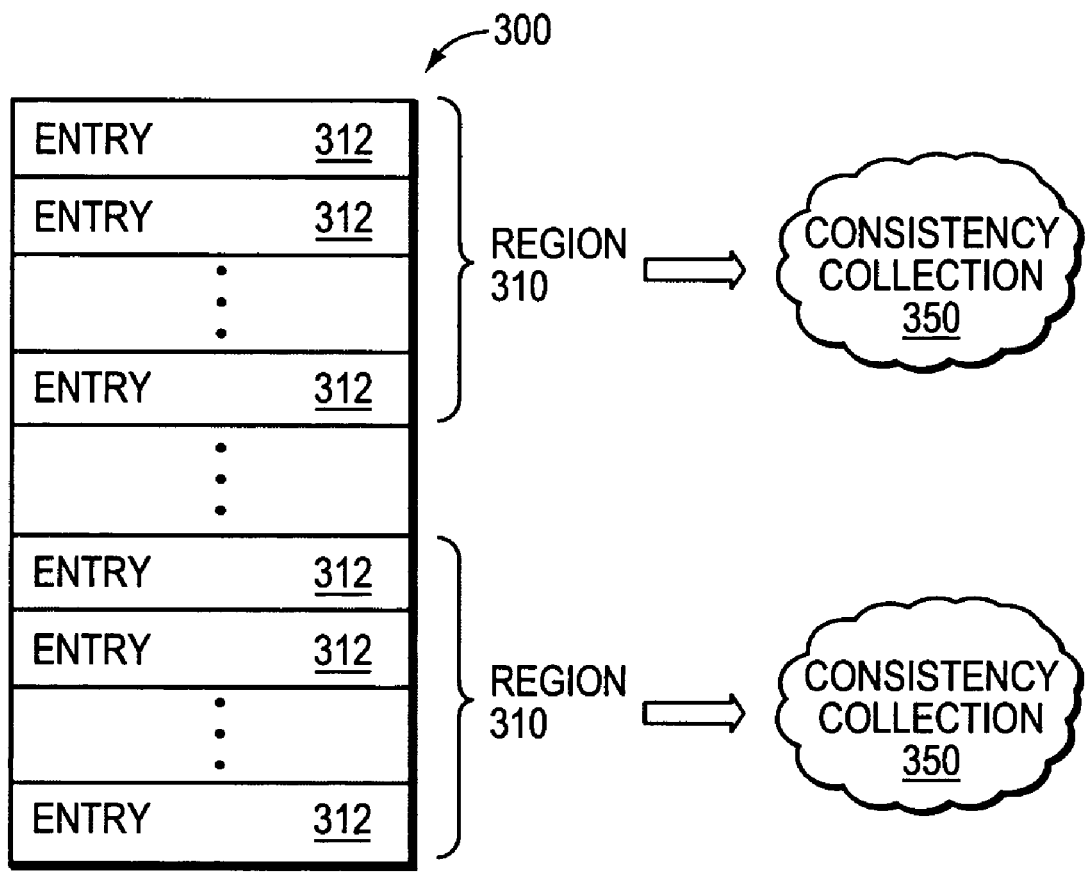
FIG. 3 is a schematic block diagram illustrating an organization of a log in accordance with the present invention.

FIG. 3 is a schematic block diagram illustrating an organization of the log in accordance with the present invention. The log 300 is organized into a plurality of regions 310, wherein each region comprises one or more entries 312 and wherein each region is allocated to a consistency collection 350. As used herein, a consistency collection 350 is defined as a set of one or more data containers among which it is desired (e.g., by a source of updates) to maintain transaction consistency, i.e., all the updates for a given transaction are targeted to a single consistency collection. Illustratively, the log manager 250 apportions the temporary, persistent storage space into regions 310 by, e.g., assigning a predetermined number of log entries 312 to each region 310 and then allocates each region to a consistency collection 350. If additional entries are needed for a consistency collection 350, another region 310 of the log 300 may be allocated to the collection.

For example, assume the disk storage space of the storage subsystem 135 is organized into multiple data containers, such as volumes 170, and the log 300 is organized within another volume 170 of a consistency collection. A source, e.g., the database application 112, 150, maintains ordering and committing of updates to the consistency collection to ensure transaction consistency. A region 310 of the log is then allocated to the consistency collection 350 by the log manager 250. Each entry 312 of the region 310 stores an update issued from the database application 150 executing on the storage system 120 and/or database application 112 executing on client 110. Thus, the consistency collection 350 may comprise multiple data containers associated with one or more applications configured to maintain the ordering of transaction updates to the collection of data containers via the log 300.

The log 300 is illustratively used to store the updates in a temporary, yet persistent fashion, so that the updates can be applied to the data containers of the consistency collections in a reliable manner. That is, if a failure occurs in the system before the updates are applied to the data containers, the data of the updates can be recovered from the log 300. The updates stored in the entries 312 of the log 300 are therefore not deleted until they are committed to the final persistent storage subsystem 135 or aborted altogether. Accordingly, the log 300 is a mechanism used to ensure that when data (in the form of multiple updates) is applied to a consistency collection 350, it is possible to always apply all of the data even if there is a failure when applying it (roll forward). Alternatively, it is possible to identify all the updates and roll them backward.

Furthermore, the log 300 may be adapted for use in the storage system 120 in a manner that is similar to that used to maintain transaction consistency in a database system. To that end, the application 112, 150 performs updates to the log in a desired order and the log is adapted to record those updates received from the application before releasing (committing) the updates to the storage subsystem 135 for persistent storage on the data containers of the consistency collection. However, unless a strict serialization mechanism is used when updating the log, the updates issued by the application are not necessarily recorded in the log 300 in the same order desired by the application due to propagation delays. Although this eliminates potential synchronization overhead between the application and log, it may lead to ordering issues. According to the invention, the log is used as a controlling mechanism for updating and maintaining (i.e., reestablishing) transaction consistency among each of the data containers of a consistency collection.

To enable reestablishment of the desired order, the updates are illustratively time stamped and sequenced, preferably by the application. Each update thus comprises metadata associated with the update, the modified data of the update, a timestamp of the update and a sequence number of the update within the transaction (e.g., a write operation to a file at a specified offset, the write data, the timestamp and the sequence number). Each update is illustratively stored in an entry 312 of the log 300 in the order received from the application, which may not be the desired order. However, use of the timestamp (and possibly the sequence number) is sufficient to recreate the desired order.

Notably, the timestamp is sufficient to synchronize between updates from the same or different sources (applications), while a sequence number is needed to ensure all updates from each application were received or alternatively to identify missing updates from an application so as to preserve the integrity of the data in the log. The combination of a timestamp and a sequence number enables the updates to be (i) sent in any order from any number of applications, (ii) received in any order at a single destination (i.e., the log), (iii) recorded in any order at the log, and (iv) applied to the final persistent storage subsystem in a manner that maintains transaction consistency. In other words, the combination of the timestamp and sequence number allows distinguishing of updates between different applications, particularly if each application may send the updates in any order, and identifying of missing updates so as to preserve the integrity of the data in the log. An example of the use of timestamps and sequence numbers in a backup and recovery system is disclosed and described in U.S. Pat. No. 7,096,382 titled System and Method for Asynchronous Replication for Storage Area Networks by Yoram Novick, issued on Aug. 22, 2006, which patent is hereby incorporated by reference as though fully set forth herein.

In the illustrative embodiment, an application 112, 150 issues updates of a transaction to the log 300, where they are recorded in entries 312 of a region 310 allocated to a consistency collection 350. As long as the consistency collection is in active mode, the updates in the entries of the region may be released from the log for persistent storage in a desired order on a storage subsystem 135 of the storage system 120. Once all of the updates of a region are released (committed) to the persistent storage subsystem or aborted altogether, the region 310 is available for reallocation. However, if the consistency collection transitions to an inactive or "frozen" mode, the updates in the entries of the region are not released from the log and region is not available for reallocation. An example of a transition of a consistency collection to a "frozen" mode is a failure to update one of the volumes 170 of the consistency collection. Another example is the requirement to access the consistency collection for read operations. Notably, the organization of the log 300 into entries 312 adapted to accommodate active consistency collection regions 310, despite the occurrence of inactive regions 310, reduces fragmentation of the log while maintaining transaction consistency.

Figure 4:
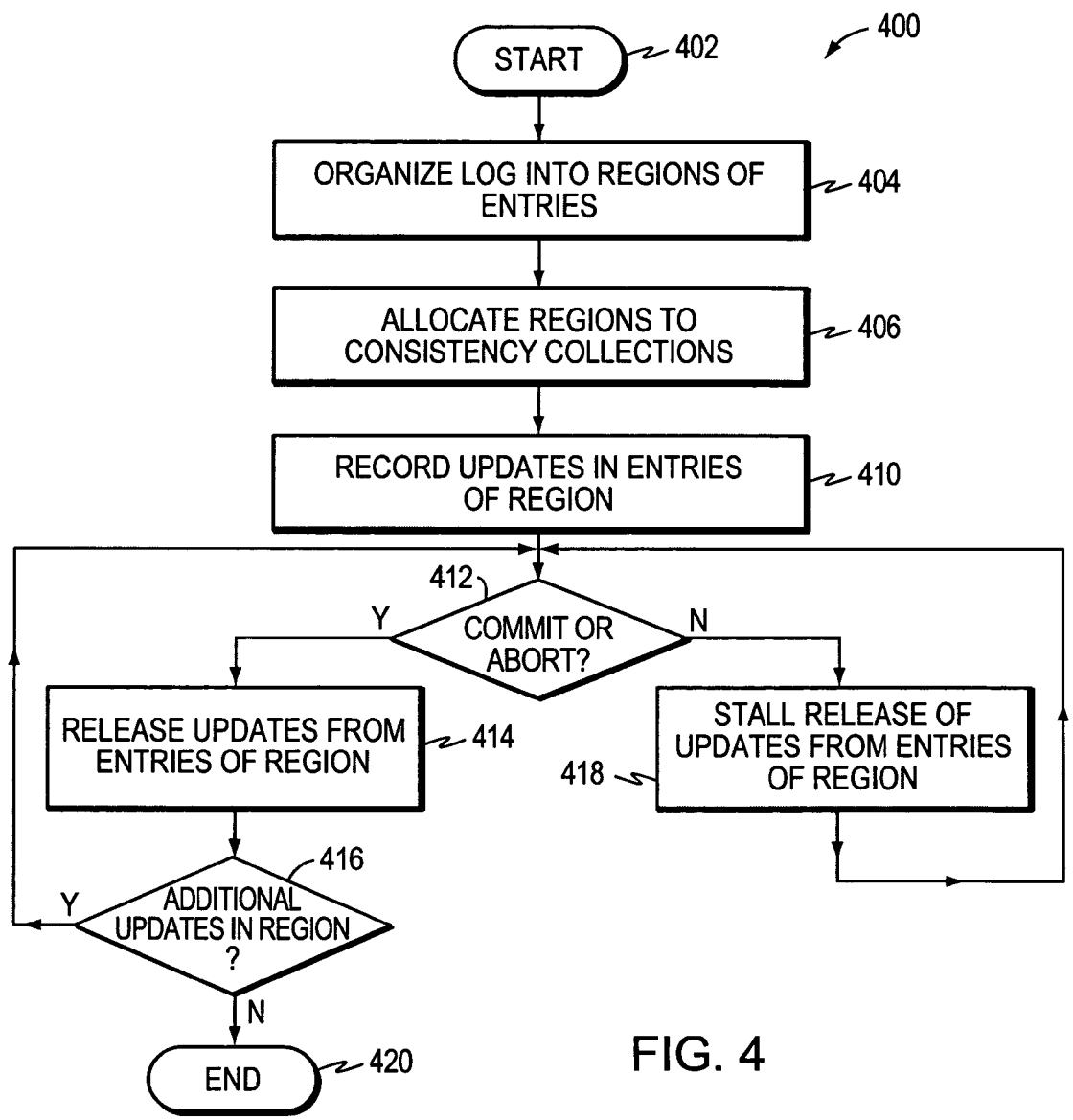
FIG. 4 is a flowchart illustrating a procedure for enhancing performance of a log adapted for use with a storage system in accordance with the present invention.

FIG. 4 is a flowchart illustrating a procedure for enhancing performance of a log adapted for use with a storage system in accordance with the present invention. Assume a first consistency collection is associated with a first application and a second consistency collection is associated with a second application. The procedure 400 starts at Step 402 and proceeds to Step 404, where the log is organized into a plurality of regions, wherein each region comprises one or more entries. In Step 406, each consistency collection is allocated to a region and, in Step 410 the updates are recorded in entries of the appropriate allocated region.

In Step 412, a determination is made as to whether a commit or abort was issued to a transaction by application 150 or 112. Note that a transaction will not be committed or aborted if the consistency collection transitions to a frozen mode. If a commit or abort is was issued, the procedure continues to Step 414 where the updates are subsequently released from the entries of each region for persistent storage on the consistency collection of the storage subsystem in a desired order. In Step 416, a determination is made as to whether there are additional updates in the region. If so, the procedure returns to Step 412; otherwise, the procedure ends at Step 420. However, if no commit or abort was issued (and therefore the consistency collection enters frozen mode), the procedure continues to Step 418 where release of the updated data associated with that consistency collection is stalled; that is, the updates cannot be released from their region of the log until the consistency collection transitions out of frozen mode back to, e.g., active mode. The procedure then returns to Step 412.

According to the invention, the data associated with a frozen consistency collection cannot be released from its region of the log and applied to the storage subsystem, but the data associated with an active consistency collection can be released and applied to the storage subsystem. This aspect of the invention reduces fragmentation of the log since one or more relatively large areas (regions) of the log are available to accommodate new updates, even though one or more regions may not.

While there have been shown and described illustrative embodiments for enhancing performance of a log adapted for use with a storage system, it is to be understood that various other adaptations and modifications may be made within the spirit and scope of the present invention. For example, in alternate embodiments, a region 310 of the log 300 may be allocated per data container (as opposed to per consistency collection 350). That is, although the illustrative embodiment allocates a region 310 of the log 300 per consistency collection 350, it is understood that a region could alternatively be allocated per data container (e.g., per volume 170), assuming that each data container belongs to only one consistency collection. In addition, the final persistent storage subsystem 135 could be organized as a log structured array having its own log.

The foregoing description has been directed to specific embodiments of this invention. It will be apparent, however, that other variations and modifications may be made to the described embodiments, with the attainment of some or all of their advantages. For instance, it is expressly contemplated that the processes and/or elements described herein can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for enhancing performance of a log adapted for use with a storage system, the method comprising:
organizing, by a log manger implemented by a processor, the log into a plurality of log regions, wherein each log region comprises one or more entries;
allocating, by the log manager, each log region to a consistency collection, the consistency collection having a set of one or more data containers among which a source of updates desires to maintain transaction consistency;
recording updates for the consistency collection in the entries of the allocated log region;
in response to the consistency collection associated with the updates being committed to a persistent storage or aborted, releasing the updates from the entries;
in response to the consistency collection being in inactive mode, stalling release of the updates from the entries; and
allowing reallocation of the allocated log region to another consistency collection once all of the updates from the previously allocated consistency collection have either been committed to the persistent storage or aborted.

2. The method of claim 1 further comprising:
implementing the log on a storage device having a temporary, persistent storage space.

3. The method of claim 2 wherein organizing comprises organizing the temporary, persistent storage space of the log into a plurality of log regions.

4. A system configured to enhance performance of a log adapted for use with a storage system, the system comprising:
an operating system implemented by a processor;
a source configured to issue updates to data;
a plurality of consistency collections configured to persistently store the updates in a desired order, the consistency collections comprising a set of one or more data containers among which the source desires to maintain transaction consistency; and
a log manager implemented by a file system configured to organize the log into a plurality of log regions and to allocate each log region to a consistency collection, the log manager further configured to,
record the updates for the consistency collection in the allocated log region,
release the updates from the log region in response to the consistency collection associated with the updates being committed to a persistent storage or aborted, stall the release of the updates from the log region in response to the consistency collection being in inactive mode, and allow reallocation of the allocated log region to another consistency collection once all of the updates from the previously allocated consistency collection have either been committed to the persistent storage or aborted.

5. The system of claim 4 wherein the source comprises:
an application executing on a client computer configured to interact with the storage system in a client/server model of information delivery.

6. The system of claim 4 wherein the source comprises an application executing on the storage system.

7. The system of claim 6 wherein the application is configured to maintain ordering of the updates to the log.

8. The system of claim 7 wherein the application is configured to time stamp and sequence each update.

9. The system of claim 8 wherein each update comprises:
metadata associated with the update, modified data of the update, a timestamp of the update and a sequence number of the update within a transaction.

10. The system of claim 4 wherein the consistency collection comprises:
a set of one or more data containers among which it is desired to maintain an order of updates of a transaction to the data containers.

11. The system of claim 10 wherein the data containers are volumes.

12. The system of claim 4 wherein the log is implemented on a storage device having a temporary, persistent storage space.

13. The system of claim 12 wherein the log manager is configured to:
organize the temporary, persistent storage space of the log into a plurality of log regions.

14. The system of claim 13 wherein the log manager is embodied as a process of a file system of the storage system.

15. The system of claim 13 wherein the log manager is embodied as a process of a disk driver executing on the storage system.

16. The system of claim 13 wherein the log manager is embodied as log management software of a storage operating system executing on the storage system.

17. An apparatus configured to enhance performance of a log adapted for use with a storage system, the apparatus comprising:
an operating system implemented by a processor;
means for organizing the log into a plurality of log regions, wherein each log region comprises one or more entries;
means for allocating each log region to a consistency collection, the consistency collection comprising a set of one or more data containers among which a source of updates desires to maintain transaction consistency;
means for recording updates for the consistency collection in the entries of the allocated log region;
means for in response to the consistency collection being in an active mode, releasing the updates from the entries;
means for in response to the consistency collection being in inactive mode, stalling release of the updates from the entries; and
means for allowing reallocation of the allocated log region to another consistency collection once all of the updates from the previously allocated consistency collection have either been committed to a persistent storage or aborted.

18. A computer readable medium containing executable program instructions for enhancing performance of a log adapted for use with a storage system, the executable instructions executed by a processor comprising:
program instructions that organize the log into a plurality of log regions, wherein each log region comprises one or more entries;
program instructions that allocate each log region to a consistency collection, the consistency collection comprising a set of one or more data containers among which a source of updates desires to maintain transaction consistency;
program instructions that record updates for the consistency collection in the entries of the allocated log region;
program instructions that release the updates from the entries in response to the consistency collection being in an active mode;
program instructions that stall release of the updates from the entries in response to the consistency collection being in inactive mode; and
program instructions that allow reallocation of the allocated log region to another consistency collection once all of the updates from the previously allocated consistency collection have either been committed to a persistent storage or aborted.

19. The computer readable medium of claim 18 further comprising one or more program instructions for:
implementing the log on a storage device having a temporary, persistent storage space.

20. The computer readable medium of claim 19 wherein the program instruction for organizing comprises:
one or more program instructions for organizing the temporary, persistent storage space of the log into a plurality of log regions.

* * * * *